United States Patent
Abbas et al.

(10) Patent No.: US 11,061,136 B2
(45) Date of Patent: Jul. 13, 2021

(54) SONAR TRACKING OF UNKNOWN POSSIBLE OBJECTS

(71) Applicant: CODA OCTOPUS GROUP INC., Orlando, FL (US)

(72) Inventors: Syed Abbas, Orlando, FL (US); Blair Cunningham, Orlando, FL (US)

(73) Assignee: CODA OCTOPUS GROUP INC., Orlando, FL (US)

( * ) Notice: Subject to any disclaimer, the term of this patent is extended or adjusted under 35 U.S.C. 154(b) by 0 days.

(21) Appl. No.: 16/368,843

(22) Filed: Mar. 28, 2019

(65) Prior Publication Data
US 2020/0292699 A1    Sep. 17, 2020

Related U.S. Application Data

(60) Provisional application No. 62/818,682, filed on Mar. 14, 2019.

(51) Int. Cl.
| | | |
|---|---|---|
| *G01S 15/66* | (2006.01) | |
| *B63B 35/04* | (2006.01) | |
| *G01S 15/00* | (2020.01) | |
| *G01S 15/89* | (2006.01) | |

(52) U.S. Cl.
CPC ............. *G01S 15/66* (2013.01); *B63B 35/04* (2013.01); *G01S 15/006* (2013.01); *G01S 15/8993* (2013.01)

(58) Field of Classification Search
CPC .......... G01S 15/89; G01S 15/06; G01S 15/66; G01S 15/8993; G01S 15/88; B63B 35/03; B63B 35/04
See application file for complete search history.

(56) References Cited

U.S. PATENT DOCUMENTS

| | | | | |
|---|---|---|---|---|
| 4,164,379 A | * | 8/1979 | Denman | F16L 1/235 405/158 |
| 5,231,609 A | * | 7/1993 | Gaer | G01S 15/00 367/117 |
| 5,504,685 A | * | 4/1996 | Wapner | G01N 3/303 701/400 |
| 6,354,764 B1 | * | 3/2002 | Brown | B23K 20/085 405/158 |
| 6,438,071 B1 | * | 8/2002 | Hansen | G01S 15/89 367/88 |
| 6,683,819 B1 | * | 1/2004 | Estaphan | B63B 21/66 367/106 |
| 9,019,795 B2 | * | 4/2015 | Sloss | G01S 15/66 367/11 |
| 2004/0013471 A1 | * | 1/2004 | Matthews | G01S 15/89 405/154.1 |

(Continued)

OTHER PUBLICATIONS

Tao et al., "3D acoustic image segmentation by a RANSAC-based approach," OCEANS. 2003, IEEE Cat. No. 03CH37492), San Diego, CA, USA, 2003, pp. 1098-1101 vol. 2 (Oct. 2003).

*Primary Examiner* — Carib A Oquendo
(74) *Attorney, Agent, or Firm* — Barnes & Thornburg LLP (57) ABSTRACT

Reflected sonar signals arising from one or more possible unknown objects are distinguished according to a first criterion, and possible shapes each having a defined unique associated point are assigned each of the possible unknown objects. Then the three dimensional points are tracked by the sonar system.

15 Claims, 5 Drawing Sheets

(56) References Cited

U.S. PATENT DOCUMENTS

| | | | |
|---|---|---|---|
| 2014/0064032 A1* | 3/2014 | Sloss | G01S 7/52003 367/88 |
| 2014/0126962 A1* | 5/2014 | Bianchi | F16L 1/235 405/170 |
| 2016/0124105 A1* | 5/2016 | Valsvik | B63G 8/001 367/15 |
| 2016/0306040 A1* | 10/2016 | Hunt | G01S 7/6272 |

* cited by examiner

SONAR TRACKING OF UNKNOWN POSSIBLE OBJECTS

RELATED PATENTS AND APPLICATIONS

The following US patents and US patent applications are related to the present application: U.S. Pat. No. 6,438,071 issued to Hansen, et al. on Aug. 20, 2002; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015; U.S. patent application Ser. Nos. 14/927,748, 15/978,386, and 14/927,730 filed on Oct. 30, 2015, Ser. No. 15/978,286 filed on May 14, 2018, Ser. No. 15/908,395 filed on Feb. 28, 2018, Ser. No. 15/953,423 filed on Apr. 14, 2018 by Sloss are also related to the present application. The above identified patents and patent applications are assigned to the assignee of the present invention and are incorporated herein by reference in their entirety including incorporated material.

FIELD OF THE INVENTION

The field of the invention is the field of visualization and use of data from sonar signals scattered from sparse objects immersed in a fluid.

OBJECTS OF THE INVENTION

It is an object of the invention to improve the tracking of unknown possible objects using sonar imaging. It is an object of the invention to measure and record the positions and orientations of possible objects with unknown shapes. It is an object of the invention to measure the increase or decrease in the probability that a possible object is a real object as the possible object is being tracked. It is the object of the invention to refine the measurements of the shapes of unknown objects over time while the objects are tracked.

SUMMARY OF THE INVENTION

One or more large arrays of sonar detectors are used to produce three dimensional sonar images possible unknown objects. A series of sonar pings are sent into an insonified volume of water and the reflected or scattered sonar pings are analyzed to produce a 3 dimensional map of points which have scattered the sonar ping. The points are segregated by one or more techniques, and one of a defined set of shapes is assigned to each segregated set of points. Each of the defined set of shapes has an associated defined unique 3 dimensional point and possibly a defined spatial orientation. For each ping, the defined position is recorded and tracked from ping to ping to provide a record of the track of the defined shape.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be difficult for even the best and fastest computers to pick out. Much effort has thus been spent in turning data into images.

In particular, images which are generated from data which are not related to light are often difficult to produce and often require skill to interpret. One such type of data is sonar data, wherein a sonar signal pulse is sent out from a generator into a volume of fluid, and reflected sound energy from objects in the insonified volume is recorded by one or more detector elements. The term "insonified volume" is known to one of skill in the art and is defined herein as being a volume of fluid through which sound waves are directed. In the present invention, a sonar signal pulse of sound waves called a ping is sent out from one or more sonar ping generators, each of which insonifies a roughly conical volume of fluid.

The field of underwater sonar imaging is different from the fields of medical ultrasonic imaging and imaging of underground rock formations because there are far fewer surfaces in the underwater insonified volume.

Figure 1:
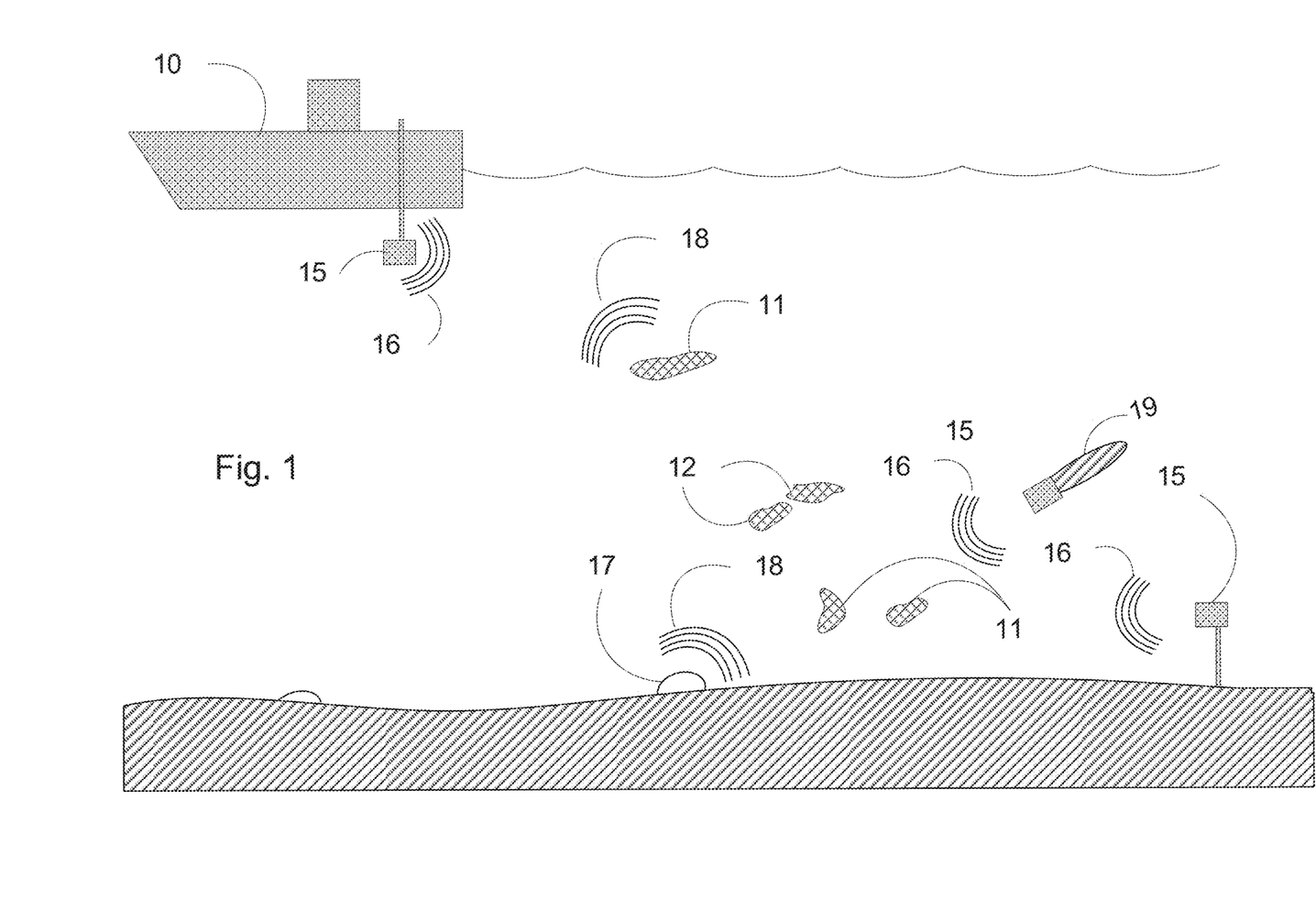
FIG. 1 shows equipment useful to carry out the method of invention.
Figure 2:
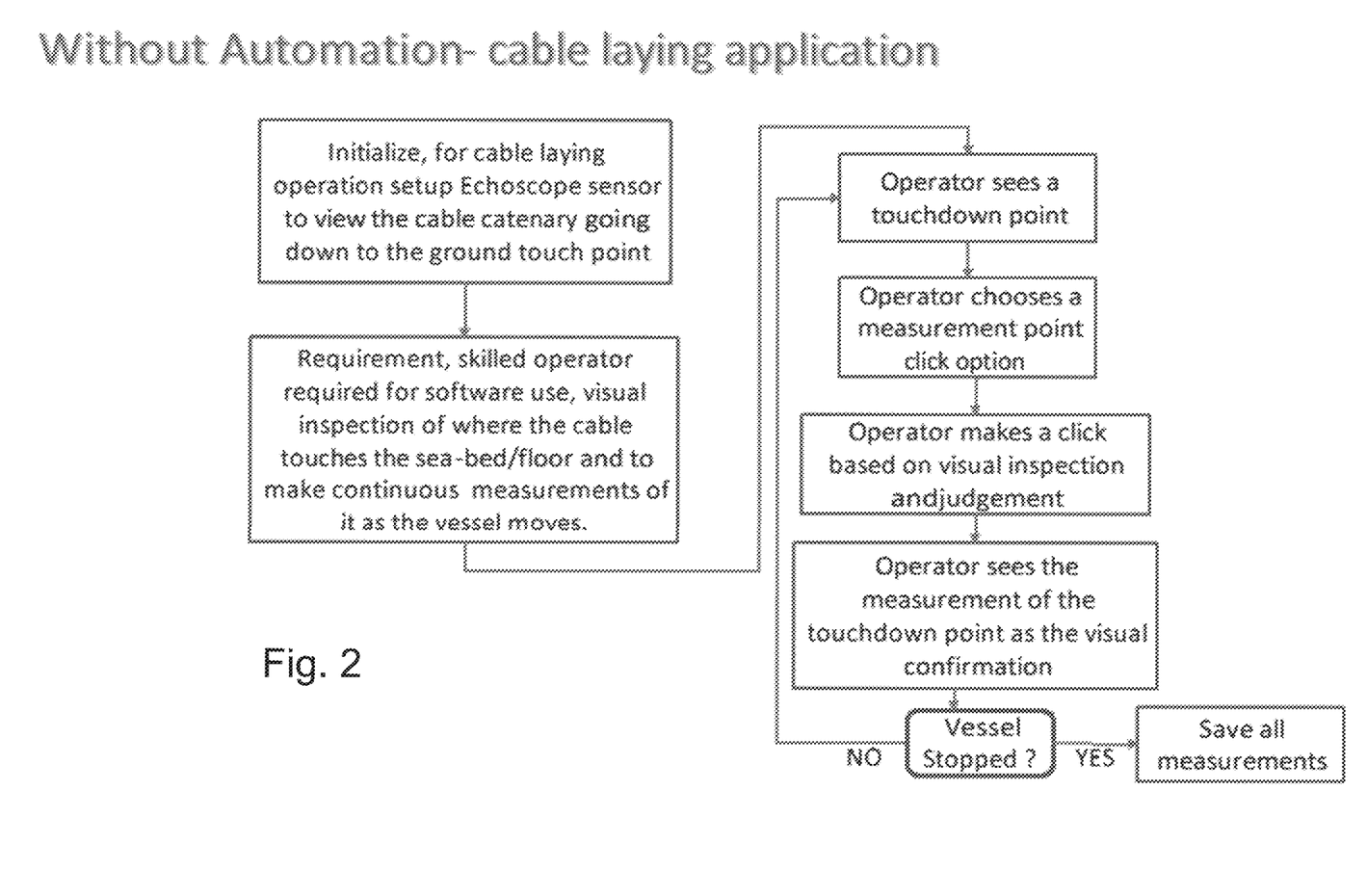
FIG. 2 shows a flow chart of a manually controlled cable measuring system.
Figure 3A:
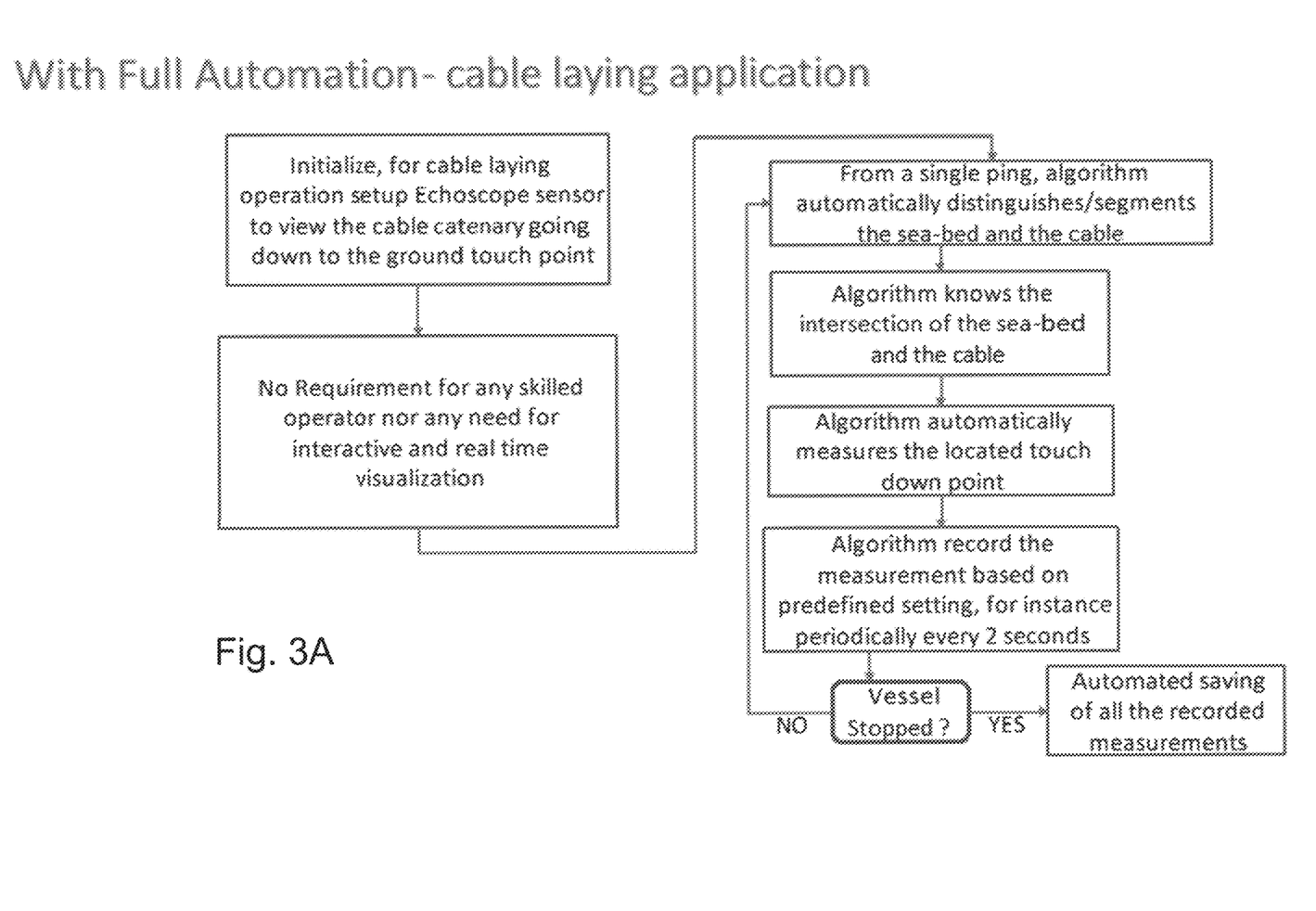
FIGS. 3A, 3B, and 3C show flow charts of an automatically controlled cable measuring system.
Figure 3B:
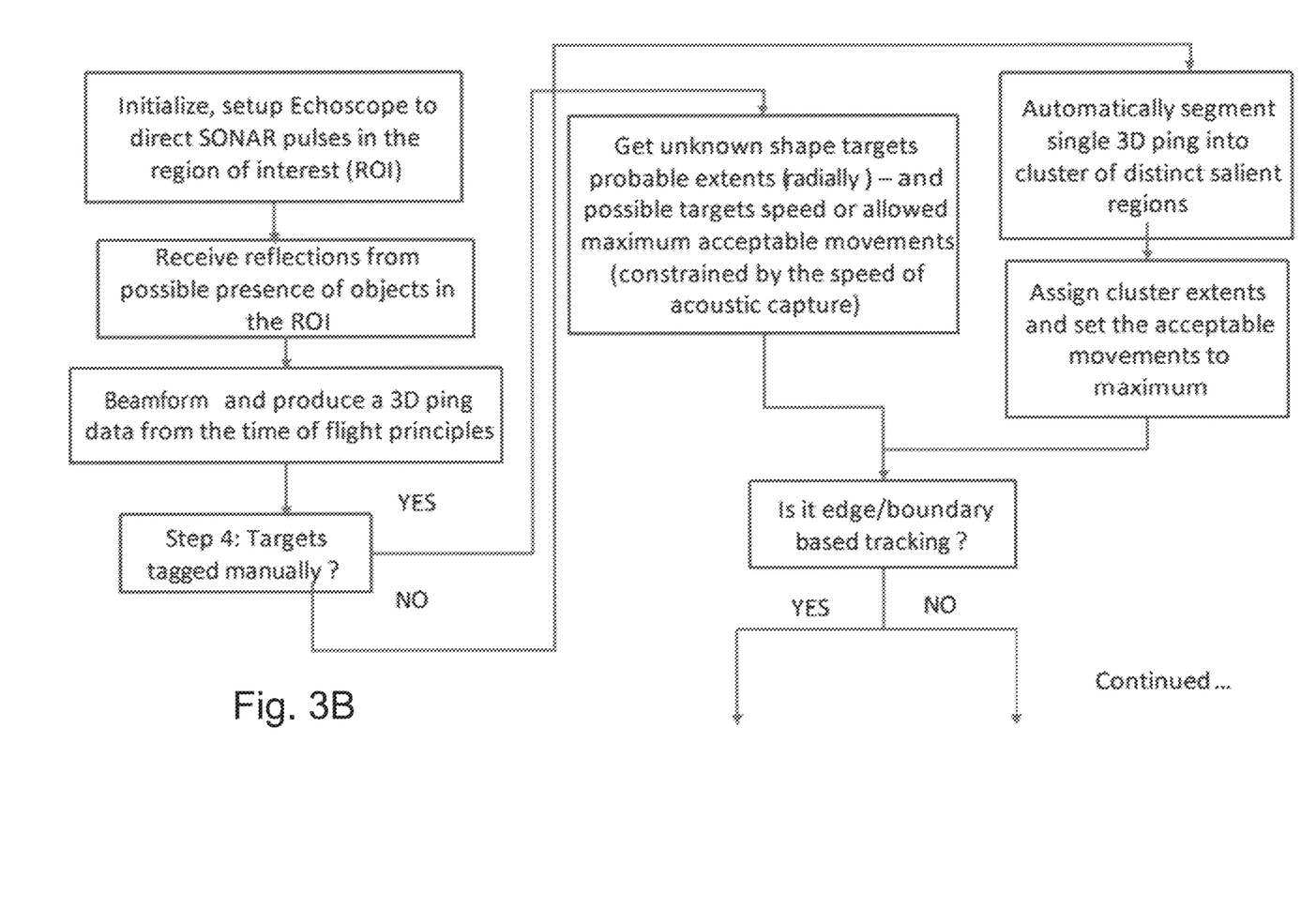
Figure 3C:
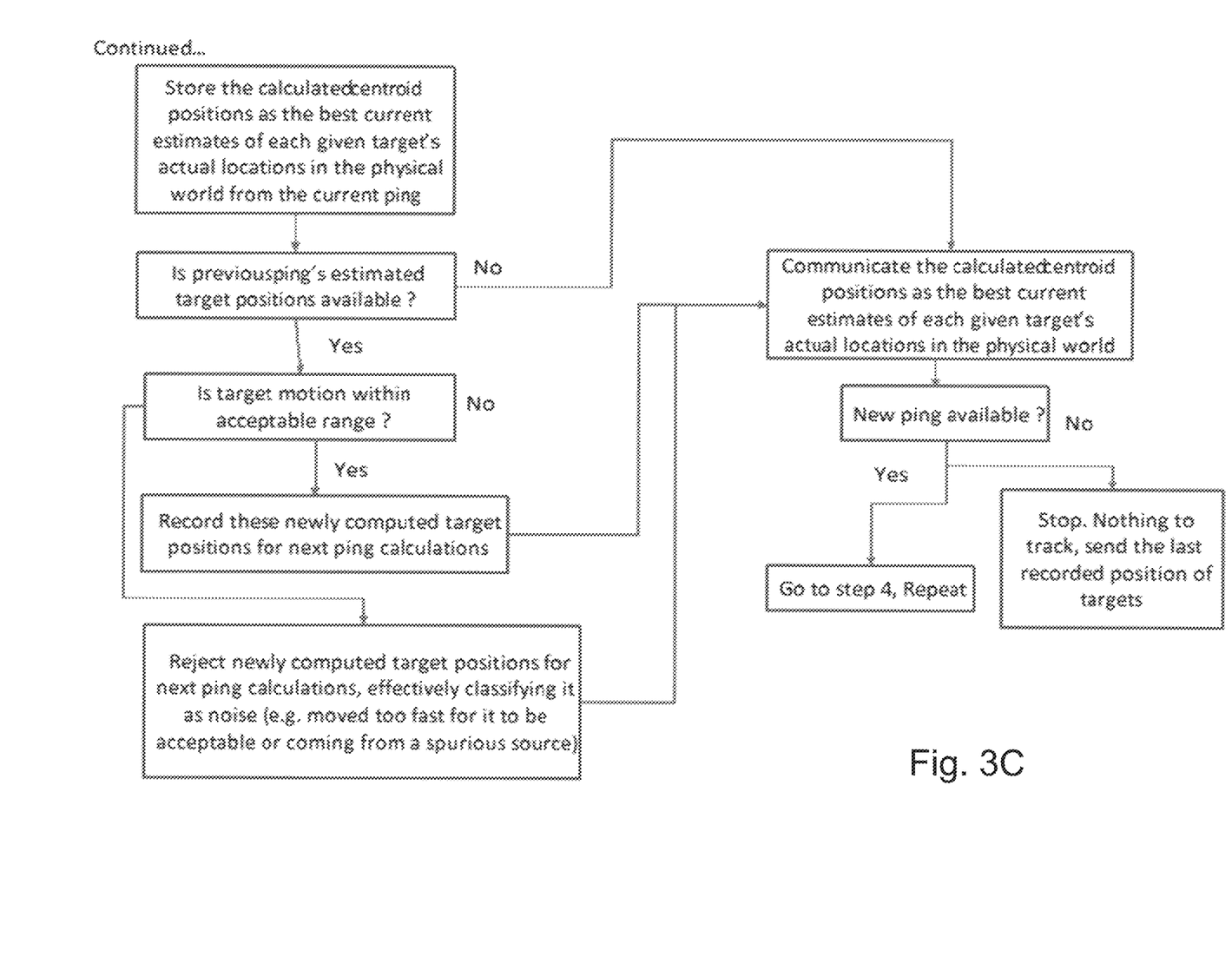

FIG. 1 shows a sketch of a vessel 10. Ultrasonic sonar generators or ping generators 15 suspended in the water emit ultra sonic sound waves 16 which strike objects or possible objects 11 and 17 in the volume or on the seafloor. The ultrasonic ping generators 15 are attached to or are in proximity to large array multielement sonar receivers (not shown) for receiving reflected sonic waves.

The sonar generators 15 may be attached to or in a known location in proximity to one or more vessels 10, or to one or more mobile underwater probes 19. Sound waves 18 are shown reflected from possible objects 11, 12 and real objects 17 back towards the one or more multielement sonar detectors. Objects and possible objects may be suspended in the water, lying on the seabed 12, or be buried in the sea bed 12. Objects 17 may be both real and known. A known object is an object with a known shape which has been previously identified and imaged, and can be recognized by the sonar imaging system or a skilled operator. Objects 11 are not immediately recognized as real, and may be spurious collections of reflections and re-reflections. Objects 12 may be one object or two. None of these possible objects can be classed as real immediately. They are affectionately known as "blobs".

However, all possible objects must be treated as if they are real for the purposes of tracking.

The ultrasonic multielement sonar detectors measure the phase, intensity, and arrival time of the reflected sonar pings 18. The phase, intensity, and arrival time data are processed to provide three dimensional location data measuring sonar reflecting surface locations. The seabed 12 surface and the object 17 surface may be similarly measured to give three dimensional location data of the reflecting surfaces.

A series of outgoing ping pulses may be sent out with an outgoing ping frequency $P_f$. A sonar ping generally has a constant sound frequency $f$. (The frequency $f$ is sometimes changed in the prior art during the ping in a method called a chirped pulse ping, where the pulse frequency either increases or decreases monotonically throughout the pulse.) A master oscillator (not shown) produces a square wave voltage output at frequency $f$, and the ping generator uses the master oscillator to produce outgoing sinusoidal sound waves in phase with the master oscillator. The reflected sound waves 18 are received by each detector element one or more of the large multielement sonar detector arrays associated with each ping generator 15. The detector arrays measure the pressure vs time of the reflected ping sound waves at each element and return an analog electrical voltage signal representing the sound amplitude versus time of the sound wave impinging on the element. The electrical voltage signals are digitally sampled at precisely known times with respect to the phase of the sent out sound waves of each ping. A large array multielement detector is preferably constructed with 24 by 24 or more sonar detector elements arranged orthogonally as a square grid. A two dimensional sonar detector array which has m by n elements, where m and n are different integers, will have different angular resolutions in two orthogonal angles.

The attenuation of the sent out and received sonar signals is dependent on the sent out frequency $P_f$. As the frequency $P_f$ increases, the sonar resolution increases and the detection range decreases. The frequency $P_f$ may be changed from ping to ping to either see further at the expense of resolution, or to see more detail of the closer sound reflecting objects. A skilled operator is needed for manual control of the ping frequency $P_f$, or a computer is needed programmed to change frequency $P_f$ according to a criterion, such as the need for higher resolution or greater range.

The amount of raw digital data generated by large array sonar detectors is often too great either to transmit to the surface vessel from the array detector or to store for later analysis. This is especially true for independently operated probes without high speed data connections to the cable laying vessel 10. In these cases, the raw data must be analyzed close to the detector, so that command signals sent to the control vessel may be sent by low bandwidth means such as sound waves.

The method of the invention starts out by processing the phase, intensity, and arrival time data to provide three dimensional location data points related to the sonar reflecting surface locations. The three dimensional data points are segregated according to a criterion to provide groups of data points. Among the possible criterion are whether two groups of points are separated by more than a defined distance. Another criterion may be that the points are located under the sea bed, for example, or too far from the generator detector. A number of segregation criterion are published in the literature.

The next step in the method of the invention is to fit each of the segregated groups of points into a defined known shape chosen from a set of defined known shapes. Shapes are chosen from the set of defined known shapes according to a criterion. For example, a number of shapes are tried, the shape which contains the most points in the least volume is assigned to that particular group. We assign a position point to each one of the set of the defined known shapes in order to locate the defined known shape. In the preferred method of the invention, the simplest mathematical shape which can be used is a sphere of radius r. For the sphere, we choose the center of the sphere as an assigned position point. In general, we assign a unique position point for each member of the set of defined known shapes. One convenient unique position point is the calculated center of mass of the defined known shape, as if the assigned shape were filled uniformly with material of constant density. We then choose the calculated position of the center of mass as the position of the shape for the purposes of tracking.

We call the center of mass so calculated a centroid. The next simplest shape to a sphere is an ellipsoid which has a centroid position point determined as the point halfway along the ellipsoid major axis. The orientation of the ellipsoid, in contrast to a sphere, can be recorded as the angular coordinates of the major axis. More complicated shapes may be assigned with each having a defined shape having a defined unique position point which defines the three dimensional position of the shape. Two angular coordinates as well as the three spatial coordinates are useful in tracking the assigned shape.

Any number of defined shapes can be used, such as cylinders with square ends, cylinders with half spherical end caps, partial cones, etc. Each shape will have its own degrees of freedom, or parameters that defines that shape and these parameters have to be estimated in real time from statistical fit to the data obtained from each ping. The method of the invention uses one or more pings to assign a centroid point and possibly the orientation for each blob for each ping.

The centroid points are recorded for each ping or series of pings, and are plotted in 3 dimensional space as a function of time for tracking purposes. As more data is gathered, the shapes may become better defined, and a new defined shape might be chosen to better follow and track the object. Two or more of the objects may even coalesce into one shape, or one shape will break into two or more shapes depending on such things as the sonar reflectivity over the surface of the shape. As the shapes become better known, centroids can be calculated for each of them to add to the defined set of shapes.

Points may be associated with each shape other than the calculated center of mass. The most preferred method of the invention is to use the centroid of the defined shape as defined herein.

Obviously, one or more possible objects can be tracked, even as real objects turn and/or rotate and present surfaces of different sonar reflectivity to the detection system. An object with a flat surface that specularly reflects the sonar signals will seem to have that surface disappear, and then reappear as a vastly increased signal as the flat surface turns normal to the incoming sonar signals. A human diver releases streams of bubbles with every breath, and the group of bubbles has high sonar reflectivity. The bubbles rise from the source at a known velocity and vertical direction, and are segregated from the signals from the diver. The rising bubbles may now be segregated out and the signals ignored from subsequent pings. The diver may then be classed as a cylindrical known object having mobile arms and legs, and tracked thereafter.

Among the criterion used to ignore signals from possible unknown objects are signals showing an object is moving with an unreasonably high velocity.

Techniques provide automation of sub-processes based on the resultant confidence based tracked data, including (a) automatic recording of the tracked position for applications such as Cable Laying where the operator is mandated to record the TDP (Touch Down Point) every x meters/feet; (b) When the 3D Real-Time Imaging technology is used in conjunction with a Pan and Tilt system—allow focus tracking of the target in centre of FoV to optimise the accuracy and distance to target for the sensor; (c) Automatic Platform Guidance providing live positioning at high update rates and with forward predictive techniques move the platform on which the 3D real-Time Imaging technology is mounted to an optimum placement near the target being tracked; and (d) Automatic 3D Real-Time Imaging technology sensor live adjustment for changes in range, frequency, FoV and other acoustic parameters of the sensor to continually and automatically optimize the 3D real-time imaging data quality and reduce noise content.

One more aspect is the adaptive nature of shape assignment which is the searching in live 3D data.

Even though an initial location and radius—or 4 scalar parameters that defines a sphere and we start testing it in the 3D ping data, we also adapt, like move within local imposed constraints in the direction where there is maximum overlap of the beam/3D points with the shape. Small adjustments to the radius of sphere are allowable in the search to maximizing 3D to become inliers of that particular shape.

But intensity changes detection does not cover that criterion of splitting of single object into multiple. That would be another criterion for decomposition and composition of simple objects.

To define a sphere, globally two parameters are sufficient, a vector 3D location and a scalar radius. So in all a total of 4 scalar parameters are needed to define a sphere. A template shape is chosen in parallel with other shapes from a list of mathematically described shapes such as spheres, ellipsoidal, cuboid, parallelepiped, etc, with increasing number of parameters or geometrical complexity and tested against the live 3D measurements to obtain a matching score based on number of criteria such as maximal overlap, partial edge detection, etc., the best matching score's shape is then selected in winner-take-all (WTA) scheme.

The following is a list of criteria for using in the detection of unknown possible shapes/objects of interests. Each of these can be run in parallel to create a consensus model that would use a majority of matching criteria for final selection:
 1. Partial/Full edge match—Like half-cylinder
 2. Maximal overlap of parallel—for 6 DOF matching
 3. Changes in intensity received in acoustic signal—useful for changing shape that arbitrarily orients
 4. Initial and previous computed or known position
 5. Speed of motion
 6. Any additional priors about the shape With respect to item 1. (Partial/Full edge match—Like half-cylinder), if there is some type of edge based information—it may be defined by a continuous surface of say open cylinder on one side but closed on the other—one can find how many beam points in a single ping fit in a least square sense to that shape of surface (by simply computing the Euclidean measure of the shortest distance of actual point to the surface)—for example a side of an AUV resembling a cylinder. That fitting will have some residual error i.e. not all point will perfectly fall on the surface d=0(or the edge/boundary of the object) or inversely will tell the score of fit, the smaller the error the higher is the fitting score.

DOF is degrees of freedom, for instance a sphere is a simplest 3D shape, also called as geometric primitive in computer graphics, that is unbiased in all dimensions, (i.e. same measure in all direction, if it was longer in any dimensions it would become an ellipsoid, but why restrict to 3D you can have a 4D hyper-sphere if include intensity is included as another dimension)—one can move anywhere in 3D space (rotations do not matter for an isometric object), and one can have an arbitrary scalar value of radius, hence for detection and tracking purposes, 4 scalar values completely define a sphere or in other words constrain its freedom of movement and extent/encapsulation.

Scores are algebraically just an error function that aggregates the errors from individual beam points, and geometrically it means finding all the points that are near the assumed geometrical model. For instance in case of a sphere, all the beam points that belong to a region of segmented cluster can be evaluated. One way is to use the volume based overlap or all the beam points enclosed by the sphere are spared from computation since they are called inliers as far as this shape is concerned, but all the points that belong to the segmented cluster but are not enclosed by the sphere will contribute to errors from those specific outlier points. Now another measure would be from surface, i.e. no longer the distance computation is from the center of sphere, but errors are calculated from the beam points to the surface of the sphere in 3D space. This will be an edge based metric, that is a set of beam points that cluster close to the surface will tell as the boundary based errors $A=4\pi r^{2}$, and beam points enclosed by the volume will give us maximal overlap or volume based error—${\displaystyle V={\frac {4}{3}}\pi r^{3},}$. So there are multiple ways of fitting the existing data to the shape model—whether volume based or surface/edge based—which in turn will be determined by how error measurement is defined, e.g. from the center of sphere to the points respecting the radius, or from the surface of the sphere to the points respecting the curvature.

An example expounds this better: out of 1000 beam points in a single ping measurements, the following would be one way to calculate volume/overall-based scores:
 850 inliers for a sphere
 800 inliers for a cube
 875 inliers for an ellipsoid with its major axis after alignment in Z direction
 932 inliers for a cylinder with it height aligned along Z direction
 943 inliers for an apriori model number X (use can provide more number of objects to match) given by the user—a known shape prescanned by the user—a mine that is cylinder looking overall, but a bump which no geometric primitive can capture without having multiple enormous number of them to define that irregular bump.

So in this case the analysis is:
 1. of all the possible geometric shapes—a cylinder best defines the data in the SONAR ping with 932 inliers.
 2. If an apriori model is supplied by the user—that goes beyond the geometric primitive to also capture the irregular bump at the one end of the cylindrical object, then clearly 943>932, hence the apriori model number X wins.

In image based SONAR detection, edges are computed based on intensities—or more specifically gradient (change) of intensities gathered from 2D SONAR. In this method the data is spatially oriented in a global 3D space and the object boundary is computed based on the segmentation—which also uses spatial criteria rather than intensity based edge computation.

The following is a list of criteria for using in the detection of unknown possible shapes/objects of interests. Each of these can be run in parallel to create a consensus model that would use a majority of matching criteria for final selection:
 1. Partial/Full edge match—Like half-cylinder
 2. Maximal overlap of parallel—for 6 DOF matching
 3. Changes in intensity received in acoustic signal—useful for changing shape that arbitrarily orients
 4. Initial and previous computed or known position
 5. Speed of motion
 6. Any additional priors about the shape Multiple shapes can be scored in parallel to determine the best scored shape as a winner or best matching shape—so although final choosing is serial execution but calculations to determine which shape best matches are done in parallel.

By way of background, real-time 3D Imaging Technology in the subsea commercial and defense markets is often vital for real-time decision-making during monitoring, construction and placement applications.

The application focus is often centered on the precise location of an asset or a target location. Currently this target tracking is a manual process where a trained operator visually tracks the object with the help of software by manually providing the points on the trajectory. An alternative approach is to utilise an acoustic beacon system such as USBL or LBL where the target has a beacon attached and this is then located using acoustic positioning (range and bearing). This latter approach is prone to issues and very slow update rates, at best 1 Hz update is achievable. Additionally, providing only a target position does not allow the operator to visually see one asset with respect to another or the target placement position.

The goal of automatic tracking in 3D space and time is three-fold:
1. Automatically track the target with a high update rate (>20 Hz) and a rules-based approach for noise and movement filtering to increase accuracy and confidence.
2. Present the tracked target position as well as the 3D real-time imaging data for user visual confirmation and confidence
3. Provide automation of sub-processes based on the resultant confidence based tracked data, including:
   a. Automatic recording of the tracked position for applications such as Cable Laying where the operator is mandated to record the TDP (Touch Down Point) every x Meters/feet
   b. When the 3D Real-Time Imaging technology is used in conjunction with a Pan and Tilt system—allow focus tracking of the target in centre of FoV to optimise the accuracy and distance to target for the sensor
   c. Automatic Platform Guidance providing live positioning at high update rates and with forward predictive techniques move the platform on which the 3D real-Time Imaging technology is mounted to an optimum placement near the target being tracked
   d. Automatic 3D Real-Time Imaging technology sensor live adjustment for changes in range, frequency, FoV and other acoustic parameters of the sensor to continually and automatically optimize the 3D real-time imaging data quality.

Problem to Solve

Given a typically noisy real-time 3D imaging data set, track a desired target or targets that does not possess a well-defined shape but is/are distinct from the background, in 3D space and time. For given applications, the tracking could be any size of object that the 3D real-time imaging technology can see and for larger objects, multiple target points on the object could be tracked independently and simultaneously, or independently moving multiple objects. specific use case examples:

1. Diver tracking: This challenging application is almost exclusively performed by USBL—acoustic tracking or by a 2D sector scanning system; however, both have significant constraints in terms of its accuracy and applicability in certain environments. This is further complicated by the bubble trail from the diver which causes interference for the USBL systems and great ambiguity of position for 2D scanning systems. This is easily extendable for multiple divers.

2. Cable Tracking and TDP automation: To visualize and correctly monitor cable lay operations, it mandates the use of real-time 3D imaging technology given the need to see the able in the water column relative to the seabed and lay corridor. A trained operator is assigned to manually track the cable touchpoint on the sea-bed as well as monitoring the catenary of the cable for over stress of the bend radius or slack which could cause spooling. The goal of the proposed solution is to automate this tedious task. Planar segmentation is used to estimate the sea bed position as the background and then use the lowest point on the foreground cable as the touchdown point to provide accurate and automated tracking of the cable. Use of Multiple Target Tracking would in addition provide multiple returns along the section of the cable adjacent to the seabed and therefore allow catenary monitoring or computation.

3. ROV/AUV Tracking: Tracking of ROV and AUVs can be extremely useful in both seabed search and recovery operations as well as military covert operations. Guidance of ROV and AUV into docking stations and "garages" is only one close-range application example. Without an onboard tracking device on an ROV, the goal is to automatically track a localized ROV or an AUV as seen by a 3D SONAR device. Use of multiple target tracking in this scenario would allow a better indication of the ROV or AUV, for example tracking the corners of the ROV Chassis would allow angular referencing of the face of the ROV even though a priori model of the shape is unknown.

In addition to tracking the centre or specific edges of the objects, size of the object can be equally important and useful for certain applications. As such, the proposed technology will not only calculate and output the tracked position at high output rate (>20 Hz) but also provide the maximum extent information of the object as computed in the radial search—so providing Height, Width and Depth information also.

Proposed Solution

The following pseudo-code captures all the concrete different steps involved in the implementation of the proposed solution:
1. Initialize the position of target/targets with known seed locations.
2. Check if planar segmentation is required (user configuration), then use RANSAC method to fit a planar model to the existing points in the ping/3D data.
3. Prepare a kd-tree and use either all the data without segmentation or the foreground data after eliminating inliers from planar segmentation.
4. Set up the radial search on the prepared kd-tree data structure and gather all the located points within the vicinity of user configured radial distance.
5. Compute the centroid of all the potential located points in the neighborhood of the target location from Step 4.
6. Compare previous time instance centroid with the newly computed centroid, and if the newly computed centroid is within the maximum allowed movable range of the target as configured by the user, then use the new centroid as the updated target location.
7. Store this as a previous location for next time instance,
8. Publish the result, the final tracked 3D location, on a serial port for the visualizer software to pick up the target tracking.
9. Repeat from step 2 until there is no more input data.

Techniques that are based on automatic segmentation and blob or predefined shape tracking fails in certain scenarios when the object structure is not well delineated, like real world noisy measurements or poor resolution due to distance to the target. For instance, tracking the bubble trail of a diver in zero visibility conditions is difficult but the proposed method is capable even with such an amorphous target. More sophisticated methods such as a particle filter that can compute the full 6 degrees of freedom (6 DOF) also fail when from one-time instance to another the pattern of the tracked object no longer matches in terms of 3D point structure sufficiently. However the method can be switched based on proximity such that the proposed solution tackles the challenging shapeless tracking and when the target gets near the measurement device to have a well-defined shaped due to improved resolution a full 6 DOF pattern matching method such as particle filter can be used. An automated multi-clustering method, where the set of 3D points are classified into multiple segments based on nearest neighbour search, does not accurately segment the desired target object and tracking it using the proposed or other techniques fails.

Benefits/Unique Features

Shapeless segmented foreground 3D objects/targets can be tracked automatically in 3D space and time with trajectory correcting capability from the user.

Planar segmentation using the statistical method of RANSAC that has been performed and demonstrated on the existing SONAR data is general enough to be applied independently for other applications.

This will be a key technology to not just visualize the TDP and monitor cable lay operations but also fully automate the tedious trained operator manual tracking for the first time.

Non-shape-based tracking of the proposed algorithm is novel for several applications when the shape based or pattern matching sophisticated methods fails.

This is a data driven solution, but it also has user driven customization of algorithm to tailor and allow for specialization for different applications.

These are designed specialized methods for each of the different application based on the configurable parameters on the general algorithm, with flexible additional application specific refinements that can further be augmented like filtering of the final computed trajectory.

K-d tree-based searches ensures fast multiple possible location detection even when there is no planar segmentation to reduce the number of points to be processed.

Local and global approximation schemes in the proposed solution allows selectively suppressing non-targets 3D points and constrained movement imposition on target points.

The provision of control parameters allows for complete control to the user such that the parameters can be adjusted iteratively to get the desired ranges using the tracking that is visually confirmed and acted upon.

Key and unique output data at high frame rate (>20 Hz) including full 3D position(s) with maximum extent information for the point tracked including Height, Width and Depth.

Fully integrates with Positioners and Rotators holding the 3D real-Time Imaging Technology such that the optimum pose to the target is maintained—target tracking feedback loop.

Fully integrates with the 3D Real-Time Imaging Technology to improve the sensor imaging parameters including ranges, gains, frequency and FoV to optimize the data quality and resolution of the tracked object(s) and reduce noise content.

Obviously, many modifications and variations of the present invention are possible in light of the above teachings. It is therefore to be understood that, within the scope of the appended claims, the invention may be practiced otherwise than as specifically described.

We claim:

1. A method, comprising:
    directing a first one or a first series of pulsed sonar beams into a volume of fluid, wherein the one or a first series of pulsed sonar beams is produced by a pulsed sonar beam generator in communication with the volume of fluid;
    receiving sonar signals from the volume of fluid, wherein the received sonar signals are received by a sonar signal receiver;
    analyzing the received sonar signals for each of the first one or each of the first series of received pulsed energy signals, wherein the analysis is performed with a first analysis method;
    distinguishing sonar signals arising from reflections of sonar beams from one or more possible unknown objects, wherein the sonar signals are distinguished according to a first criterion;
    assigning first possible shapes to the one or more possible unknown objects according to a second criterion, wherein each of the first possible shapes have a defined unique associated point;
    calculating three dimensional coordinates of the defined unique associated points; and
    changing at least one of the characteristics of a pulsed energy beam producer or the energy receiver wherein the characteristics are changed in response to the analysis according to a third criterion, wherein the characteristics are at least one of a range, gain, frequency, and field of view.

2. The method of claim 1, wherein a description of the first possible assigned shapes and the calculated three dimensional coordinates of the defined unique associated points are communicated.

3. The method of claim 1, further comprising:
    directing a second one or a second series of pulsed sonar beams into a volume of fluid;
    calculating new three dimensional coordinates of the first possible shapes of the one or more possible unknown objects; and
    calculating a rate of change of the three dimensional coordinates.

4. The method of claim 3, wherein the rate of change of the three dimensional coordinates is communicated.

5. The method of claim 3, wherein a description of a real time track of the three dimensional coordinates with time is stored.

6. The method of claim 3, wherein the first possible shapes of the one or more possible unknown objects are reassigned to second possible shapes, a reassignment carried out according to a fourth criterion, and calculating three dimensional positions of the unique associated points of the second possible shapes.

7. The method of claim 6, wherein the reassigned second shapes are used to replace the first shapes in previous calculations, and a new track of the unique associated points of the second shapes is recorded.

8. The method of claim 1, wherein the characteristics are changed without human intervention.

9. A method, comprising:
    directing a first one or a first series of pulsed sonar beams into a volume of fluid, wherein the one or a first series of pulsed sonar beams is produced by a pulsed sonar beam generator in communication with the volume of fluid;
    receiving sonar signals from the volume of fluid, wherein the received sonar signals are received by a sonar signal receiver;

analyzing the received sonar signals for each of the first one or each of the first series of received pulsed energy signals, wherein the analysis is performed with a first analysis method;

distinguishing sonar signals arising from reflections of sonar beams from one or more possible unknown objects, wherein the sonar signals are distinguished according to a first criterion;

assigning three dimensional positions to the one or more possible unknown objects according to a second criterion, wherein the positions are not assigned on the basis of an edge detection technique; and changing at least one of the characteristics of a pulsed energy beam producer or the energy receiver wherein the characteristics are changed in response to the analysis according to a third criterion, wherein the characteristics are at least one of a range, gain, frequency, and field of view.

10. The method of claim 9, wherein a description of the calculated three dimensional positions is communicated.

11. The method of claim 9, further comprising:
calculating the new three dimensional positions of the one or more possible unknown objects; then
calculating a three dimensional rate of change of the positions.

12. The method of claim 11, wherein a description of the three dimensional rate of change of the positions with time is communicated.

13. The method of claim 11, wherein a description of a real time track of possible positions with time is stored.

14. The method of claim 11, wherein a description of a real time track of possible position with time is communicated.

15. The method of claim 9, wherein the characteristics are changed automatically without human intervention.

* * * * *